United States Patent
Emmons et al.

(10) Patent No.: US 12,267,234 B2
(45) Date of Patent: Apr. 1, 2025

(54) ADDING ENTROPY TO DATAGRAMS CONTAINING SAMPLED FLOWS

(71) Applicant: Arista Networks, Inc., Santa Clara, CA (US)

(72) Inventors: Thomas Benjamin Emmons, Sunnyvale, CA (US); Prashant Dyamanagouda Patil, Bengaluru (IN); Reeno Joseph Baby, Bengaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/478,421

(22) Filed: Sep. 29, 2023

(65) Prior Publication Data

US 2025/0062987 A1 Feb. 20, 2025

(30) Foreign Application Priority Data

Aug. 17, 2023 (IN) .............................. 202341055059

(51) Int. Cl.
*H04L 45/00* (2022.01)
*H04L 43/024* (2022.01)
*H04L 45/24* (2022.01)
*H04L 45/74* (2022.01)

(52) U.S. Cl.
CPC .......... *H04L 45/566* (2013.01); *H04L 43/024* (2013.01); *H04L 45/24* (2013.01); *H04L 45/74* (2013.01)

(58) Field of Classification Search
CPC ..... H04L 43/024; H04L 45/24; H04L 45/566; H04L 45/74
See application file for complete search history.

(56) References Cited

U.S. PATENT DOCUMENTS

| | | | | |
|---|---|---|---|---|
| 7,484,146 B2 * | 1/2009 | Olgaard | .................. | H04L 43/50 |
| | | | | 714/724 |
| 9,363,102 B1 * | 6/2016 | Brandwine | ............. | H04L 12/54 |
| 9,445,095 B1 * | 9/2016 | Wheelock | .............. | H04N 21/60 |
| 9,521,154 B2 * | 12/2016 | Worth | .................. | H04L 63/1408 |
| 9,560,124 B2 * | 1/2017 | Eisenbud | ............ | H04L 67/1025 |
| 9,686,186 B2 * | 6/2017 | Liste | ........................ | H04L 63/00 |
| 9,729,439 B2 * | 8/2017 | MeLampy | .......... | H04L 47/2483 |
| 10,356,227 B2 * | 7/2019 | Tian | ...................... | H04L 43/022 |
| 11,223,633 B2 * | 1/2022 | Wright | ................ | H04L 63/1408 |

(Continued)

OTHER PUBLICATIONS

D. Thaler and C. Hopps. "Request for Comments (RFC) 2991: Multipath Issues in Unicast and Multicast Next-Hop Selection", Nov. 2000, 9 pages. (Year: 2000).*

(Continued)

*Primary Examiner* — George C Neurauter, Jr.

(74) *Attorney, Agent, or Firm* — Fountainhead Law Group, PC (57) ABSTRACT

Transmitting sampled flows in datagrams to a collector includes adding entropy to the headers of the UDP packets that encapsulate the datagrams. The entropy, for example, can be a timestamp associated with a sampled data packet contained in the datagram. Each UDP packet is transmitted on a data patch selected from among a plurality of data paths using at least the UDP header. The entropy in each UDP header serves to spread the transmission of UDP packets across the plurality of data paths.

16 Claims, 10 Drawing Sheets

(56) References Cited

U.S. PATENT DOCUMENTS

| | | | |
|---|---|---|---|
| 11,509,565 B2* | 11/2022 | Alimohammadifar | ................... H04L 41/12 |
| 2005/0044141 A1* | 2/2005 | Hameleers | ............ H04L 12/185 709/204 |
| 2005/0198367 A1* | 9/2005 | Ettikan | ................. H04L 69/167 709/238 |
| 2013/0318238 A1* | 11/2013 | Hall | ...................... H04L 43/028 709/224 |
| 2013/0336117 A1* | 12/2013 | Yan | ...................... H04J 3/0667 370/235 |
| 2015/0128263 A1* | 5/2015 | Raugas | ................. G06F 21/552 726/23 |
| 2020/0169513 A1* | 5/2020 | Goel | ...................... H04L 69/40 |
| 2021/0111992 A1* | 4/2021 | Nainar | .................... H04L 43/12 |
| 2021/0234768 A1* | 7/2021 | Pang | ..................... H04L 41/149 |
| 2021/0243091 A1* | 8/2021 | Raney | .................. H04L 9/0819 |
| 2022/0294712 A1* | 9/2022 | Rangarajan | ............. H04L 69/22 |
| 2023/0090802 A1* | 3/2023 | Shirlen | ................... H04L 47/41 370/390 |
| 2023/0118989 A1* | 4/2023 | Khan | ...................... H04L 45/74 709/238 |
| 2023/0164063 A1* | 5/2023 | Filsfils | .................... H04L 45/02 370/238 |

OTHER PUBLICATIONS

K. Kompella et al. "Request for Comments (RFC) 6790: The Use of Entropy Labels in MPLS Forwarding", Nov. 2012, 25 pages. (Year: 2012).*

S. Bryant et al. "Request for Comments (RFC) 6391: Flow-Aware Transport of Pseudowires over an MPLS Packet Switched Network", Nov. 2011, 19 pages. (Year: 2011).*

P. Phaal et al. "Request for Comments (RFC) 3176: InMon Corporation's sFlow: A Method for Monitoring Traffic in Switched and Routed Networks", Sep. 2001, 31 pages. (Year: 2001).*

D. Farinacci et al. "Request for Comments (RFC) 6830: The Locator/ID Separation Protocol (LISP)", Jan. 2013, 75 pages. (Year: 2013).*

Rick Hofstede et al. "Flow Monitoring Explained: From Packet Capture to Data Analysis With NetFlow and IPFIX", IEEE Communication Surveys & Tutorials, vol. 16, No. 4, Fourth Quarter 2014, 28 pages. (Year: 2014).*

Juniper Networks. "Contrail Networking Service Provider Focused Features Guide", published Aug. 10, 2023, 130 pages. (Year: 2023).*

* cited by examiner

ADDING ENTROPY TO DATAGRAMS CONTAINING SAMPLED FLOWS

CROSS REFERENCE TO RELATED APPLICATIONS

Pursuant to 35 U.S.C. § 119 (a), this application is entitled to and claims the benefit of the filing date of application No. 202341055059 filed 17 Aug. 2023 in India, the content of which is incorporated herein by reference in its entirety for all purposes.

BACKGROUND

The present disclosure relates to sFlow (sampled flow) datagrams and other similar flow sampling techniques for export at Layer 2. Packets in a given flow (e.g., between a given source internet protocol (IP) address and a given destination IP address) are sampled and packed into sFlow datagrams. Generally, sFlow datagrams sampled from a given traffic flow are sent along a fixed path to a given destination (e.g., sFlow collector). sFlow datagrams are constructed in the hardware in order to support high sample rates and wire-speed performance.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

As noted above, the sFlow sampling is performed by hardware in order to achieve high sampling rates. However, because sFlow datagrams can be processed at high sample rates, users may want to be able to spread the datagrams across their network instead of sending the datagrams on a fixed path to the collector in order to avoid congestion on the path. Entropy can be added to the datagrams in order to spread them across the network. Adding entropy in the hardware pipeline is challenging to do because the datagrams are generated in fixed logic of the hardware.

The present disclosure describes a hardware packet processing pipeline configured to process ingress packets including sampling packets and obtaining corresponding timestamps associated with the sampled packets. An sFlow datagram is generated for one or more sampled packets, and a UDP (User Datagram Protocol) packet is created to encapsulate the sFlow datagram. The timestamp corresponding to the sampled packet is inserted into the UDP header of the UDP packet that encapsulates the sFlow datagram, and in particular the source port data field, to produce a modified UDP packet. In one embodiment, the modified UDP packet can be hashed per ECMP (equal cost multipath) processing. Because the timestamp varies from one UDP packet to the next, each UDP packet will hash differently, thus propagating the UDP packets across different ECMP paths. Other embodiments can use LAG (link aggregation group) links, and even multiple collectors (e.g., using an Anycast IP address). The present disclosure generally applies to any kind of flow sampling technique. However, embodiments described herein will use sFlow as an illustrative example.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
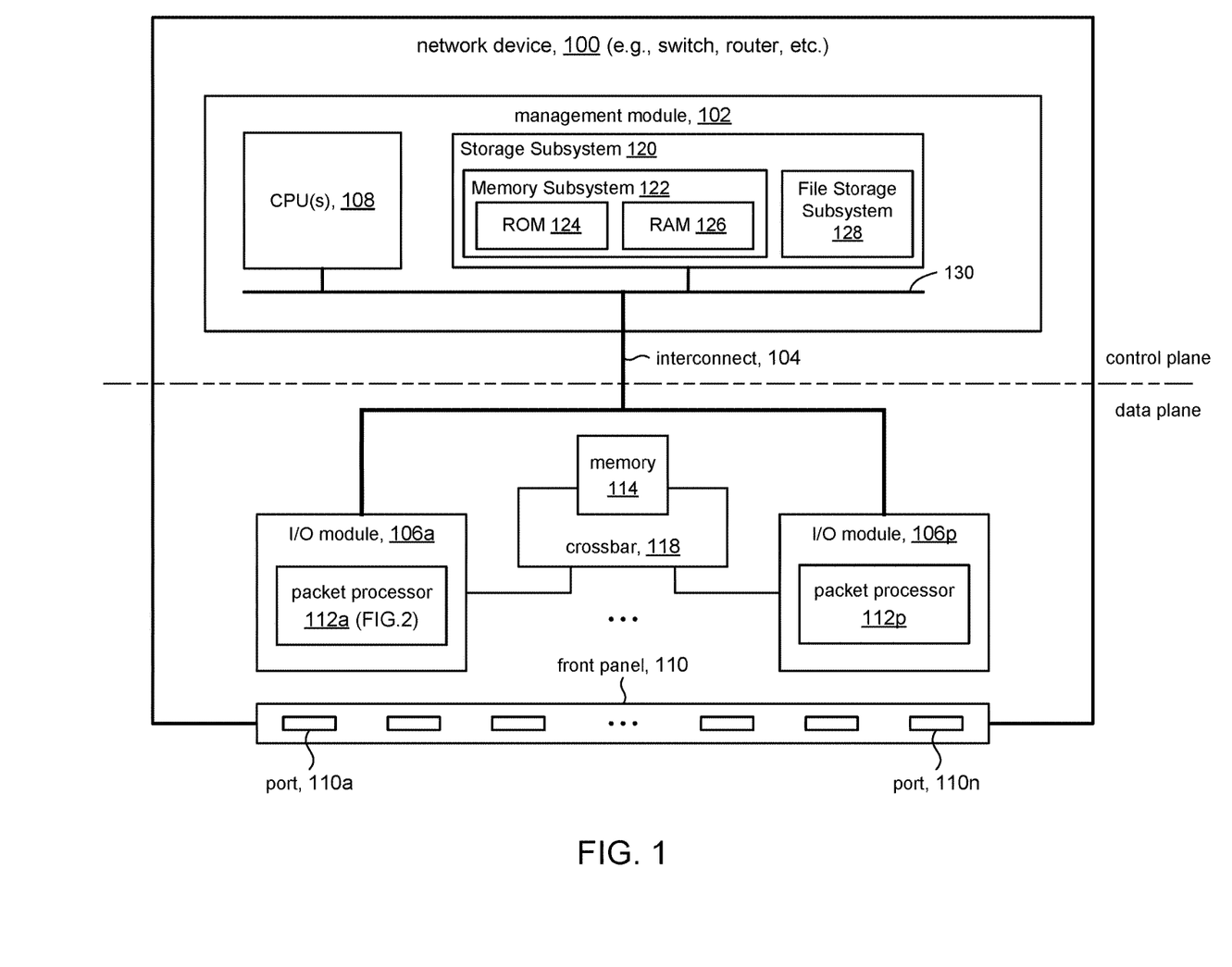
FIG. 1 shows a network device in accordance with some embodiments.

FIG. 1 is a schematic representation of a network device 100 (e.g., a router, switch, and the like) that can be adapted in accordance with the present disclosure. In some embodiments, for example, network device 100 can include a management module 102, one or more I/O modules (switches, switch chips) 106a-106p, and a front panel 110 of I/O ports (physical interfaces, I/Fs) 110a-110n. Management module 102 can constitute the control plane of network device 100 (also referred to as a control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOSR operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be any suitable bus architecture such as PCIe (Peripheral Component Interconnect Express), SMBus (System Management Bus), I2C (Inter-Integrated Circuit), etc.

I/O modules 106a-106p can include respective packet processing hardware comprising packet processors 112a-112p (collectively 112) to provide packet processing and forwarding capability. The packet processors 112 can support sFlow in accordance with the present disclosure. This aspect of the present disclosure is discussed in more detail below. Each I/O module 106a-106p can be further configured to communicate over one or more ports 110a-110n on the front panel 110 to receive and forward network traffic. Packet processors 112 can comprise hardware (circuitry), including for example, data processing hardware such as an ASIC (application specific integrated circuit), FPGA (field programmable array), processing unit, and the like, which can be configured to operate in accordance with the present disclosure. Packet processors 112 can include forwarding lookup hardware such as, for example, but not limited to content addressable memory such as TCAMs (ternary CAMs) and auxiliary memory such as SRAMs (static RAM).

Memory hardware 114 can include buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Figure 2:
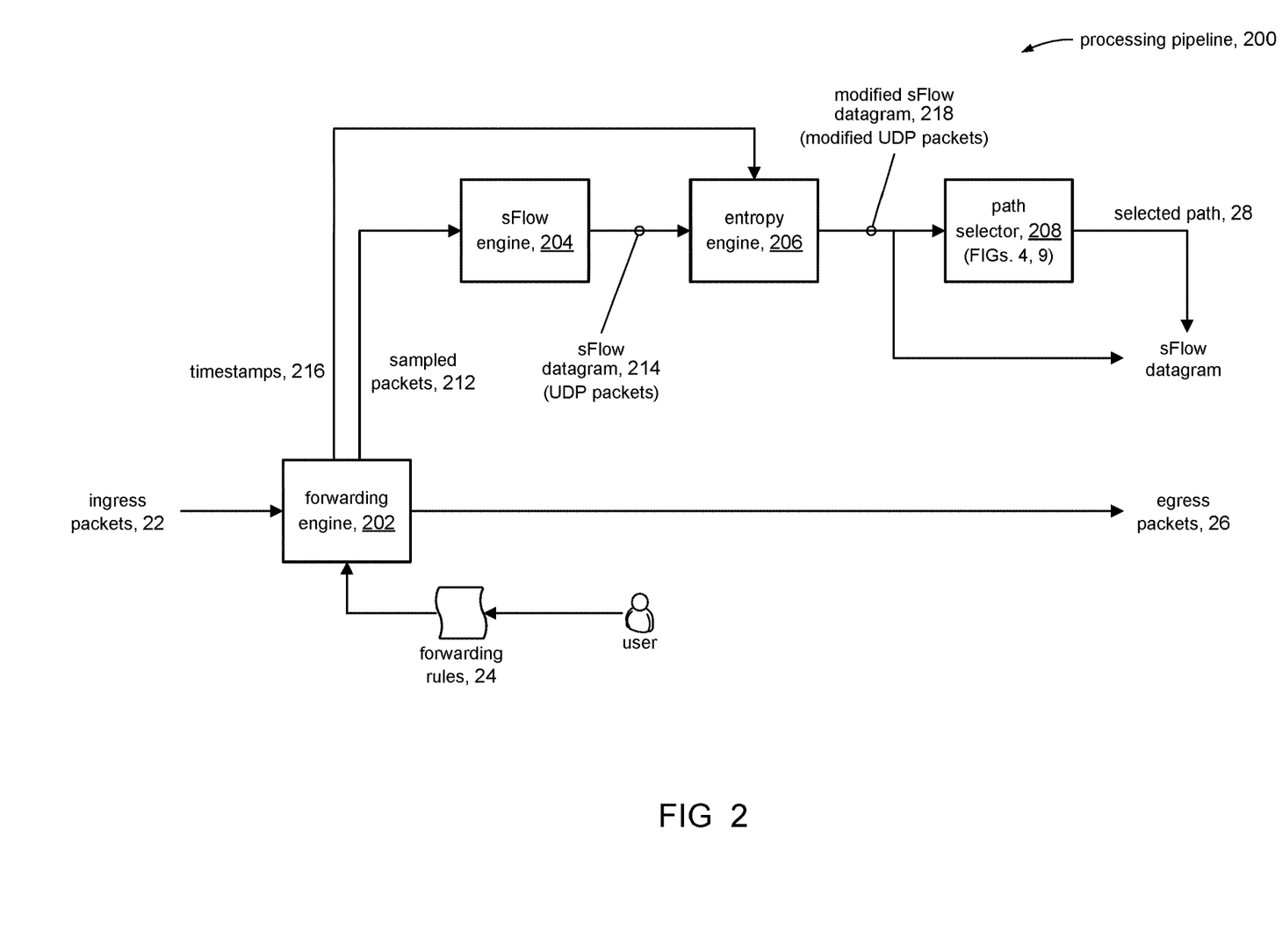
FIG. 2 shows a packet processing pipeline in accordance with some embodiments.

FIG. 2 shows details of a hardware packet processing pipeline 200 configured for sFlow processing in accordance with the present disclosure. In some embodiments, the packet processing pipeline 200 can be incorporated in the packet processors 112 in FIG. 1. Packet processing pipeline 200 can comprise hardware (circuitry) including data processing hardware such as an ASIC, FPGA, or other suitable processing unit, which can be programmed or otherwise configured to operate in accordance with the present disclosure.

In accordance with some embodiments, pipeline 200 can include forwarding engine 202 to receive ingress packets 22. The forwarding engine 200 can process packets 22 according to forwarding rules 24. Forwarding rules 24 match on various parts of the ingress packet. Matched packets can then be processed according to the action associated with a matched rule, such as dropping the packet, changing data fields in the packet header, logging information, and so on. Packets that are not dropped can be forwarded to the next hop in the network as egress packets 26. Although not shown, it will be appreciated that in some embodiments the pipeline 200 can include additional logic circuits downstream of the forwarding engine 202 to further process packets prior to egress.

In some embodiments in accordance with the present disclosure, forwarding rules 24 can include rules (e.g., input by a user) to mirror packets for a given traffic flow. A flow refers to the flow of packets between two endpoints, for example, between a client and a server. Data packets in a flow can be identified based on the source IP address and destination IP address, although it will be appreciated that a flow can be identified based on criteria other than or in addition to the source and destination IP addresses.

The forwarding engine 202 can mirror (duplicate) packets matched by a rule that defines a given flow. The mirrored packets, also referred to as sampled packets 212, can be provided to sFlow engine 204. sFlow engine 204 can generate an sFlow datagram 214 comprising one or more sampled packets. The sFlow datagram can be encapsulated in the payload portion of a UDP ("User Datagram Protocol") packet. For discussion purposes, the term "sFlow datagram" will be used to refer to the datagram itself in some cases, and to the UDP packet that contains the datagram in other cases. Persons of ordinary skill in the art can disambiguate the term based on context.

In accordance with the present disclosure, pipeline 200 can include an entropy engine 206 to add entropy to the sFlow datagram. In some embodiments, for example, the forwarding engine 202 can include front end logic to generate values called timestamps 216 which are assigned to the ingress packets 22 at the time the ingress packets are received. In some embodiments, the timestamp value can change at nanoscale timescale, and as such successive ingress packets will have different timestamp values. The forwarding engine 202 can provide timestamps 216 to the entropy engine 206 to modify the sFlow datagram 214. In some embodiments, the entropy engine 206 can add the received timestamp to the source port number ("s-port") data field in the UDP header to create a modified sFlow datagram 218. This aspect of the present disclosure is illustrated below.

In accordance with the present disclosure, pipeline 200 can include a path selector 208 to select a path 28, from among several candidate paths, on which to transmit each sFlow datagram 218. The added entropy can be used to vary the selected path from one sFlow datagram to the next. Additional details of path selector 208 are disclosed below.

Figure 3:
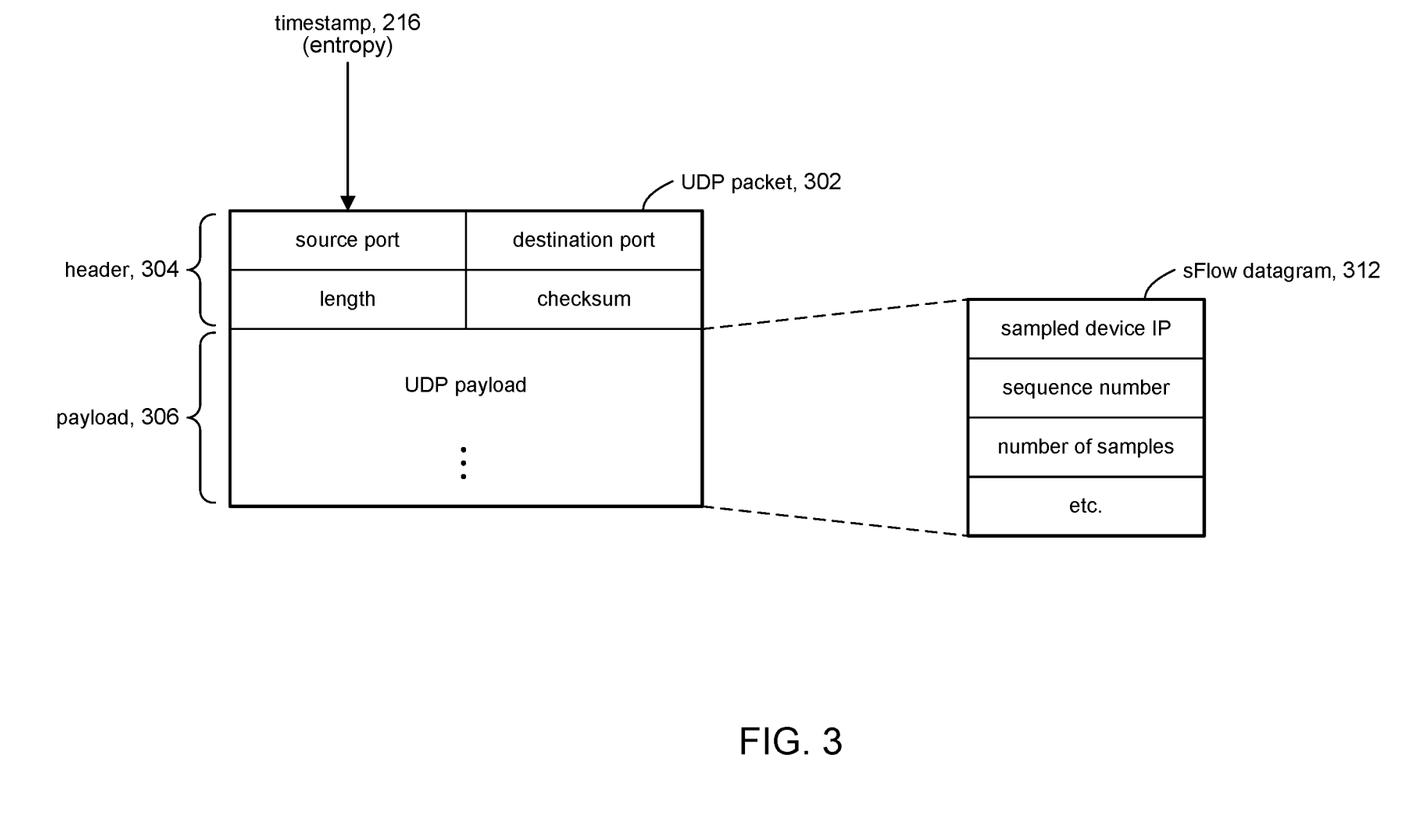
FIG. 3 shows a UDP packet encapsulating an sFlow datagram.

FIG. 3 shows the format of a UDP packet 302 and sFlow datagram 304. The UDP packet includes a header portion 304 and a payload portion 306. The header 304 comprises data fields including: source port, destination port, length, and checksum. The payload portion 306 contains sFlow datagram 312. The sFlow datagram 312, in turn, contains various information such as the sampled packet(s), the IP address of the device from which the packet(s) were sampled, a sequence number, the number of sampled packets in this datagram, and so on. Entropy (e.g., timestamp 216) can be inserted in the s-port data field in order to facilitate path selection in accordance with the present disclosure, which will now be described.

Figure 4:
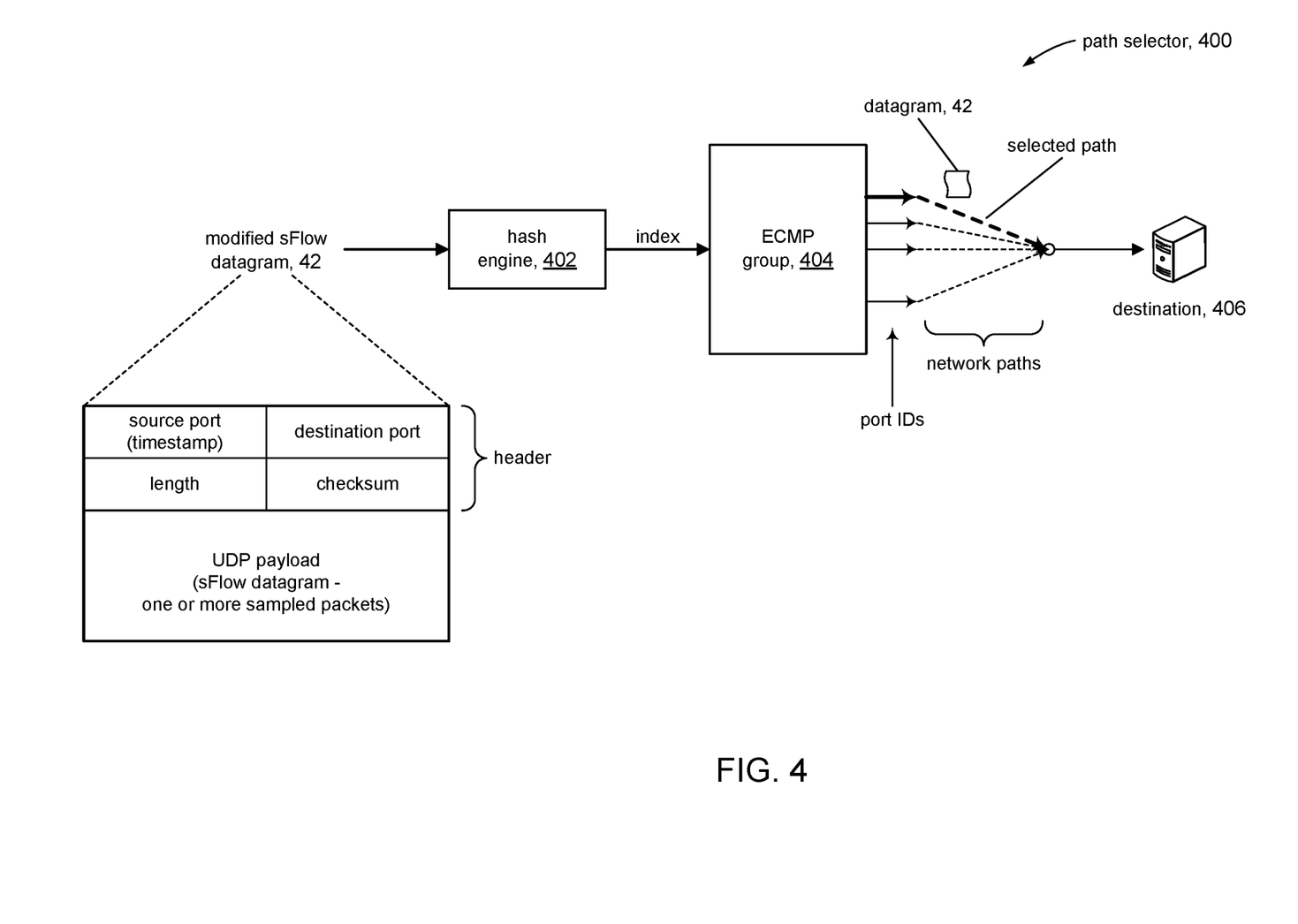
FIG. 4 shows a path selector circuit in accordance with some embodiments.

FIG. 4 illustrates details for a path selector 400 in accordance with some embodiments of the present disclosure. In some embodiments, for example, the path selector 400 can use the known method of ECMP (equal cost multipath) to select an egress port. In accordance with the present disclosure, the path selector 400 can include a hash engine 402 and an ECMP group table 404. Each entry in the ECMP group table 404 contains a port identifier of a port (interface) on the network device. An sFlow datagram 42 containing entropy is an input to the hash engine. Using at least the header portion of the UDP packet, the hash engine can compute a hash value modulo N, where N is the number of entries in the ECMP group table.

The output of hash engine 402 can serve as an index to lookup or otherwise access an entry in the ECMP group 404. The accessed entry identifies the port on which to egress the sFlow datagram 42 to a destination 406. In some embodiments, the destination 406 can be a monitoring tool such as a recorder, packet analyzer, or other such device. In other embodiments, the destination 406 can be an edge device on another network such as a monitoring fabric.

As explained above, the UDP header (e.g., the s-port data field) contains the timestamp associated with a sampled data packet contained in the sFlow datagram. Accordingly, successive sFlow datagrams for a given traffic flow will have different timestamp values. As such, successive sFlow datagrams will hash to different indices, which in turn will select different ports from the ECMP group table for egress, thus spreading the sFlow datagrams across multiple network paths to the destination 406.

Figure 5:
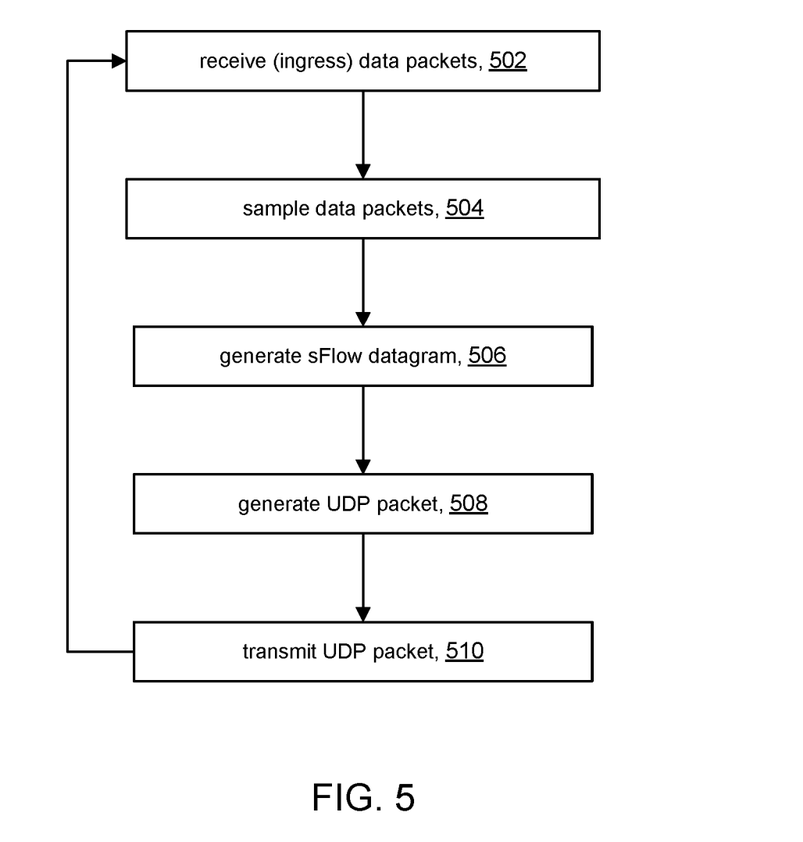
FIG. 5 shows processing of a packet processing pipeline in accordance with some embodiments.

Referring to FIG. 5, the discussion will now turn to a high-level description of processing in the packet processing pipeline (e.g., FIG. 2) in a network device for sampling traffic in accordance with the present disclosure. Processing units (circuits) in the data plane can include specialized processors such as digital signal processors (DSPs), FPGAs, ASICs, and the like, that operate by way of executing computer program code or by way of logic circuits being configured for specific operations. For example, each of the packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the processing pipeline can receive network traffic (e.g., production network traffic) comprising data packets. The data packets generally constitute different traffic flows. Data packets for a given flow can be indicated, for example, by a 5-tuple comprising source IP address, source port, destination IP address, destination port, and protocol type.

At operation 504, the processing pipeline can sample the received (ingress) packets. For example, a rule can be configured to mirror specific traffic. The rule can specify the traffic of interest (e.g., by its 5-tuple) and a destination to which to send the sampled traffic. For instance, the destination can be an IP address of a suitable collector such as a monitoring tool (packet recorder, packet analyzer, etc.), a fabric edge device of a monitoring fabric, and so on.

At operation 506, the processing pipeline can generate an sFlow datagram. In various embodiments, the sFlow datagram can comprise one or more of the sampled packets.

At operation 508, the processing pipeline can generate a UDP packet that encapsulates the sFlow datagram. The sFlow datagram can be added to the payload portion of the UDP packet. In accordance with some embodiments of the present disclosure, entropy can be added to the s-port data field in the header portion of the UDP packet (FIG. 3). Entropy refers to dynamic data that allows the processing pipeline to select a path from among several paths to send the sFlow datagram to the destination. Various examples of entropy include, but are not limited to:

timestamps—As indicated above in connection with FIG. 2, each ingress packet can be associated with a value (the timestamp) at the time the packet is received. In some embodiments, the timestamp of one of the sampled packets contained in the sFlow datagram can be added to the UDP header to create entropy in the UDP header.

sequence numbers—sFlow datagram are associated with a sequence number, where the sequence number changes from datagram to the next. In some embodiments, the sequence number can be added to the UDP header to create entropy.

random number generator—In some embodiments, the processing pipeline can include a random number generator circuit to generate a random number that can be added to the UDP header to create entropy.

At operation 510, the processing pipeline can transmit the UDP packet. In accordance with some embodiments, the processing pipeline can be configured with multiple forwarding data paths that can reach the collector. The entropy added to the UDP packets can serve to distribute the packets across the multiple data paths, thus avoiding sending the packets to the destination device along a fixed single data path, which can create congestion on that data patch. Examples of various configuration of the processing pipeline include, but are not limited to:

ECMP—As described above in connection with FIG. 2, ECMP can provide several ports on the network device for transmitting UDP packets. The entropy added to the UDP headers can ensure that successive packets hash to different ports for egress so as to evenly spread the packets across the ports in the ECMP group.

Anycast IP—Anycast is a network addressing and routing methodology in which a single destination IP address is shared by several devices (e.g. collectors) in multiple locations. In some embodiments, an anycast IP address can be shared by a set of collectors. The entropy added to the UDP headers can ensure that successive packets hash to different collectors so as to evenly spread the packets across the different collectors and hence across different data paths.

LAG (link aggregation group)—In some embodiments, the entropy added to the UDP headers can be used to select from among the LAG links so as to evenly spread the packets across the data paths to the links.

Figure 6A:
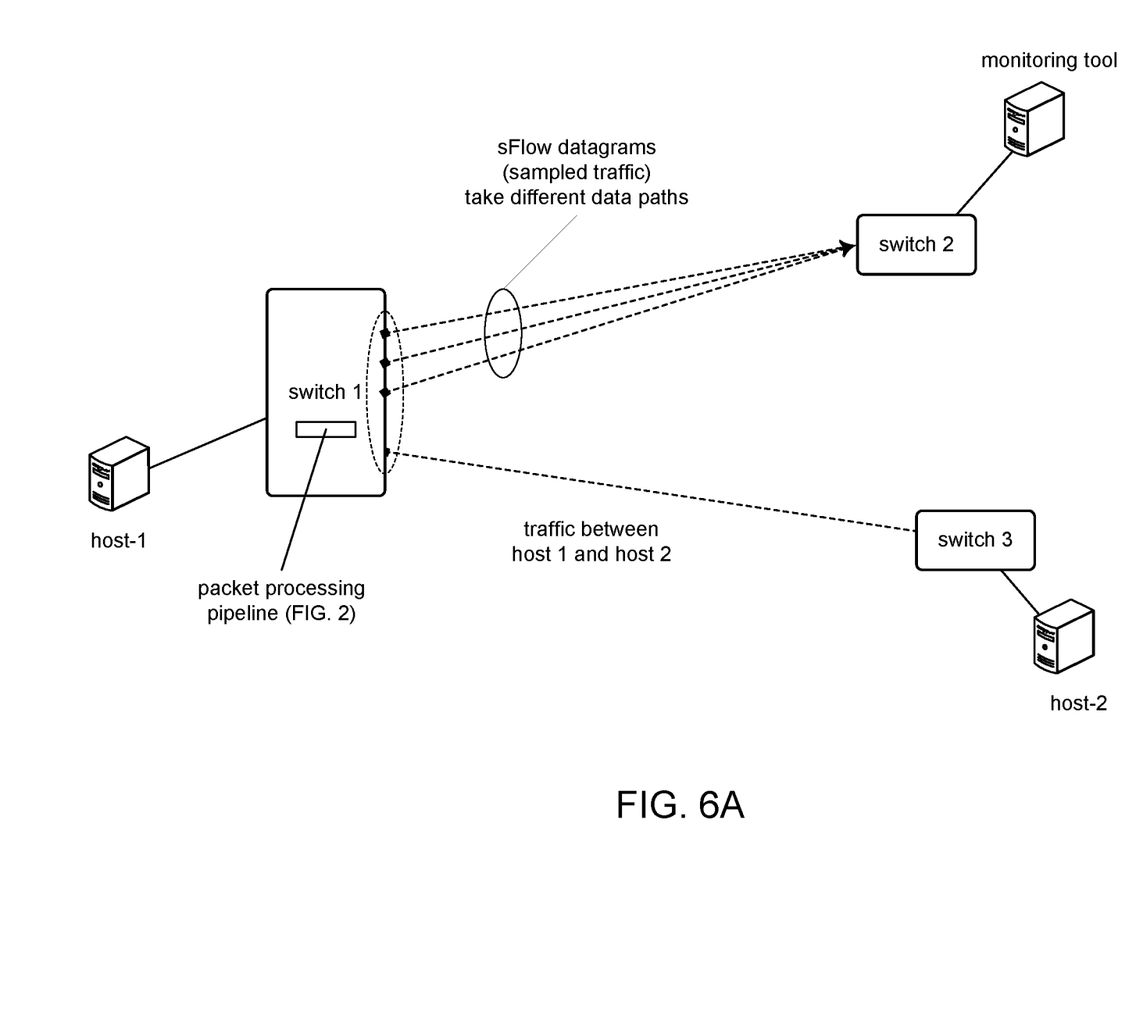
FIGS. 6A and 6B show path selection of sFlow datagrams in accordance with various embodiments.

FIG. 6A illustrates an example of packet flows in accordance with the present disclosure. The example shows traffic flow between network devices such as switch 1, switch 2, and switch 3. Switch 1 comprises a packet processing pipeline in accordance with the present disclosure; e.g., FIG. 2. The switches can be edge devices in the same network or on different networks. In some embodiments, for example, switch 2 and the monitoring tool behind switch 2 can be on the same network as switch 1. In other embodiments, switch 2 can be a fabric edge device on a monitoring fabric, and so on.

Figure 6B:
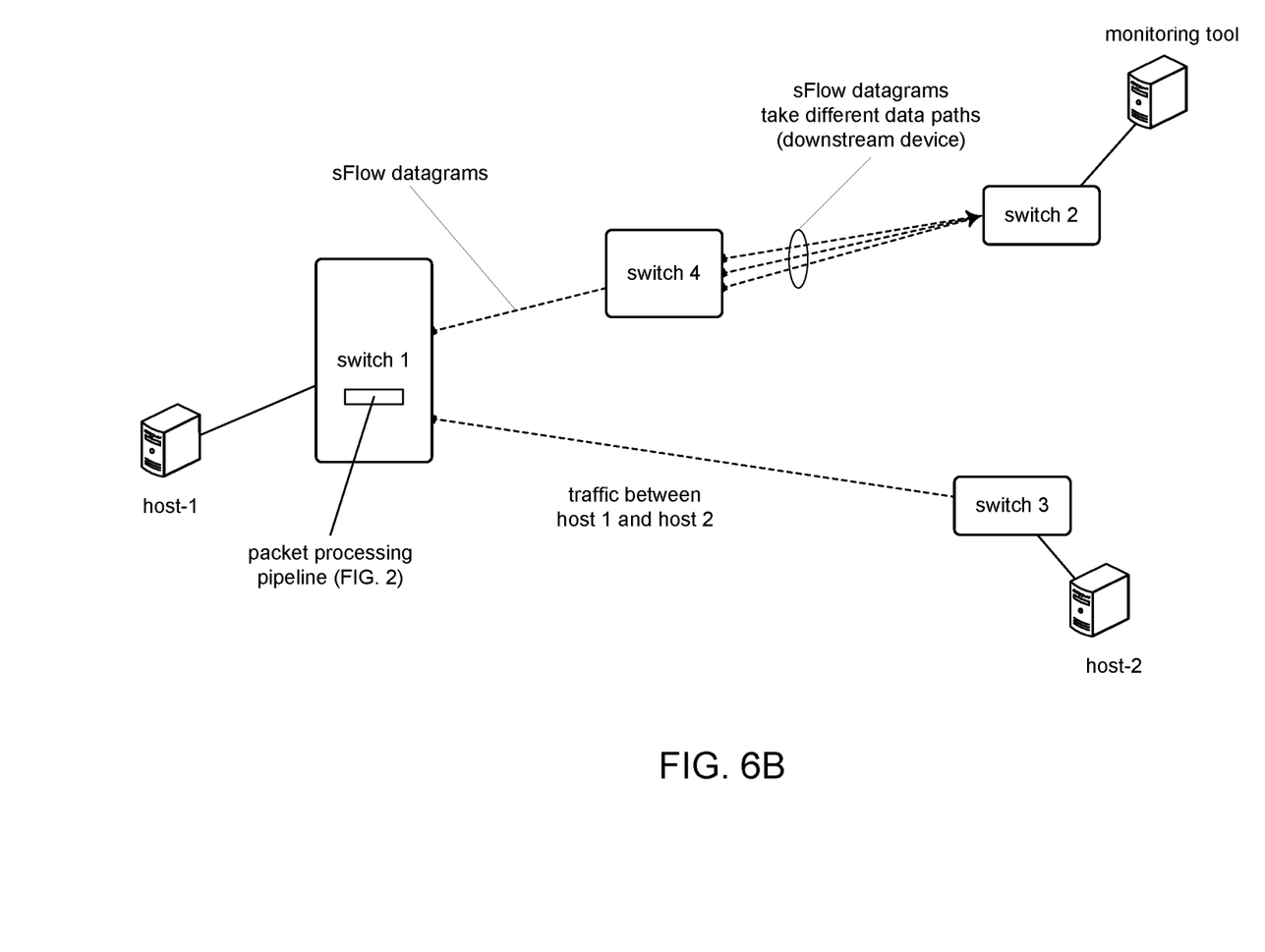

Selection of the forwarding path is not necessarily performed by the network device that generates the UDP packet. Referring to FIG. 6B, in some embodiments, the entropy added to the UDP packets can be used to select from among multiple alternate forwarding paths in a device (e.g., switch 4) downstream of the device (switch 1) that generates the UDP packet. Although not shown, it will be appreciated that the selection of the forwarding path can occur in multiple devices.

Switches 1 and 3 carry production traffic between host 1 and host 2. Suppose switch 1 is configured to sample some of the traffic between host 1 and host 2 and send the sampled traffic to the monitoring tool behind switch 2. FIG. 6 shows that processing by the processing pipeline in switch 1 in accordance with the present disclosure can result in sending the sampled traffic to the monitoring tool along different paths.

Figure 7:
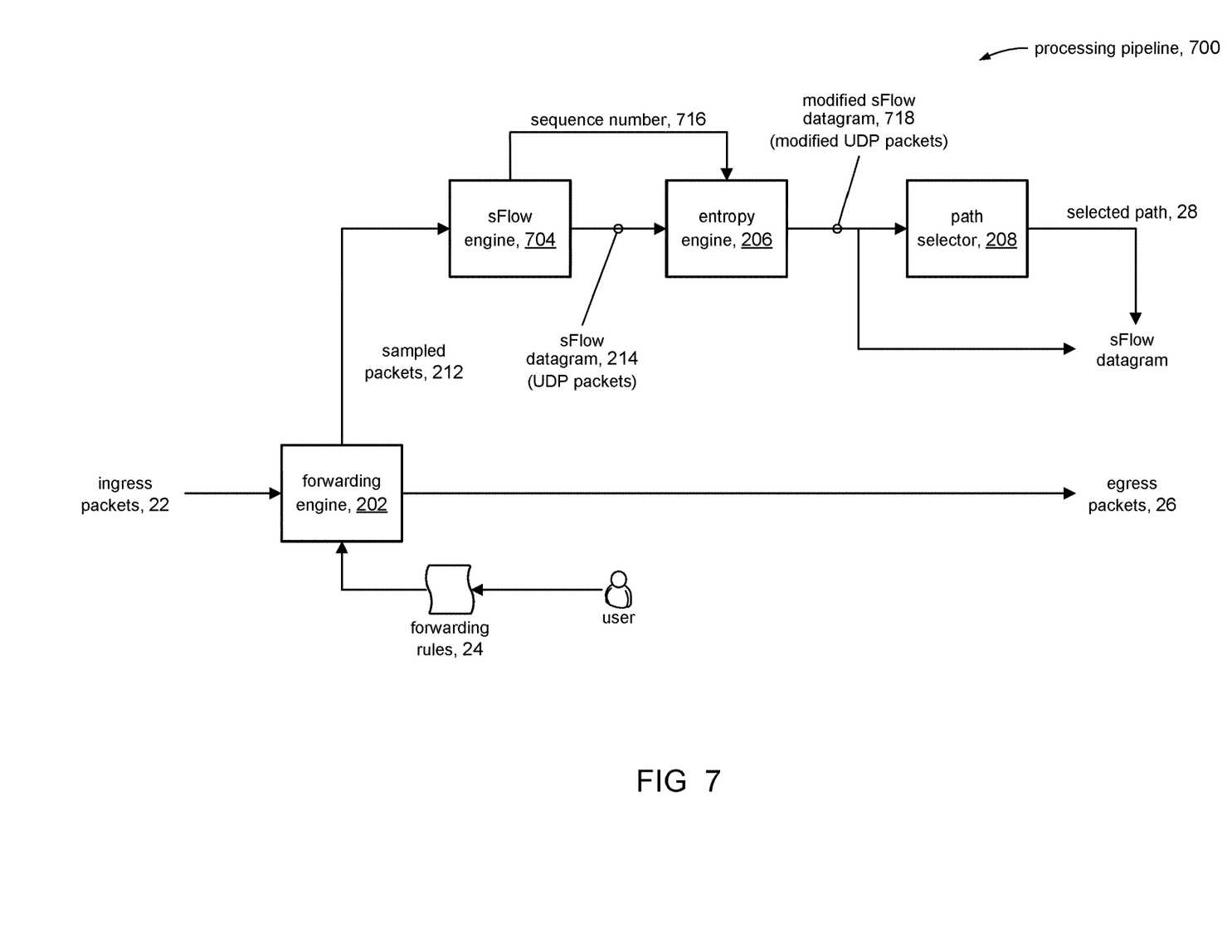
FIG. 7 shows a packet processing pipeline in accordance with some embodiments.

FIG. 7 shows a processing pipeline 700 in accordance with some embodiments as an alternative to the processing pipeline 200 in FIG. 2. Elements shown in FIG. 7 that are essentially the same as in FIG. 2 are identified by the same reference numerals as between FIG. 7 and FIG. 2.

In accordance with some embodiments, sFlow engine 704 can generate an sFlow datagram 214 comprising one or more sampled packets. The sFlow datagram can be encapsulated in the payload portion of a UDP packet. Each sFlow datagram can be associated with a sequence number 716 that is incremented with each successive datagram. In accordance with some embodiments, the sFlow engine 704 can provide the sequence number 716 to the entropy engine 206 to modify the sFlow datagram 214. In some embodiments, for example, the entropy engine 206 can add the received sequence number 716 to the source port number data field in the UDP header to create a modified sFlow datagram 718. Modified sFlow datagrams can be provided to path selector 208. The sequence number serves as entropy. When datagrams are processed as described above, the sequence numbers contained in the datagrams will serve to spread the transmission of the datagrams across multiple data paths to a collector.

Figure 8:
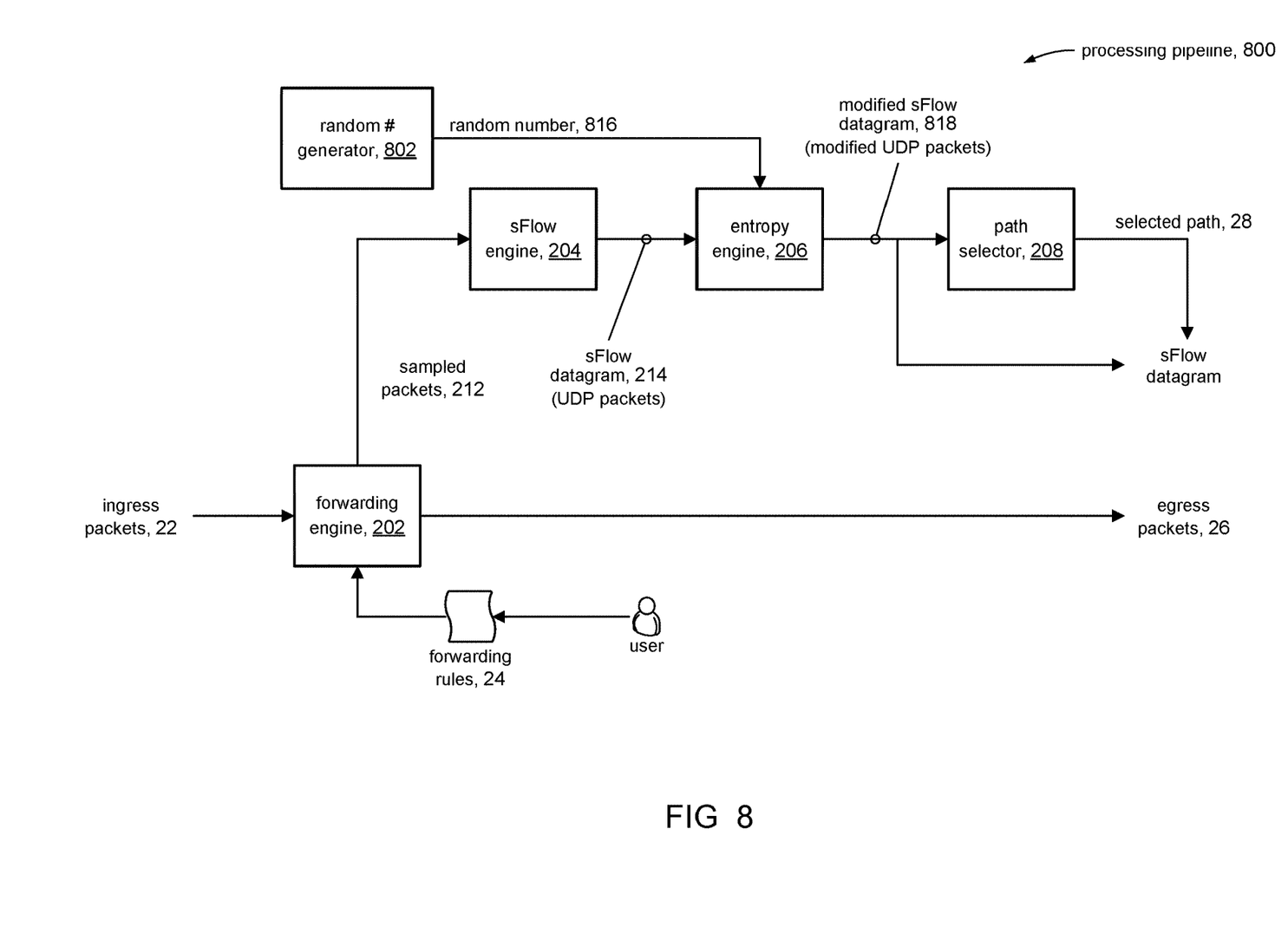
FIG. 8 shows a packet processing pipeline in accordance with some embodiments.

FIG. 8 shows a processing pipeline 800 in accordance with some embodiments as an alternative to the processing pipeline 200 in FIG. 2. Elements shown in FIG. 8 that are essentially the same as in FIG. 2 are identified by the same reference numerals as between FIG. 8 and FIG. 2.

In accordance with some embodiments, processing pipeline 800 can include a random number generator circuit 802 to generate random numbers 816. In accordance with some embodiments, the random number generator circuit 802 can provide a random number 816 to the entropy engine 206 to modify the sFlow datagram 214. In some embodiments, the entropy engine 206 can add the received random number 816 to the source port number data field in the UDP header to create a modified sFlow datagram 818. The generated random number serves as entropy. When datagrams are processed as described above, the random numbers contained in the datagrams will serve to spread the transmission of the datagrams across multiple data paths to a collector.

Figure 9:
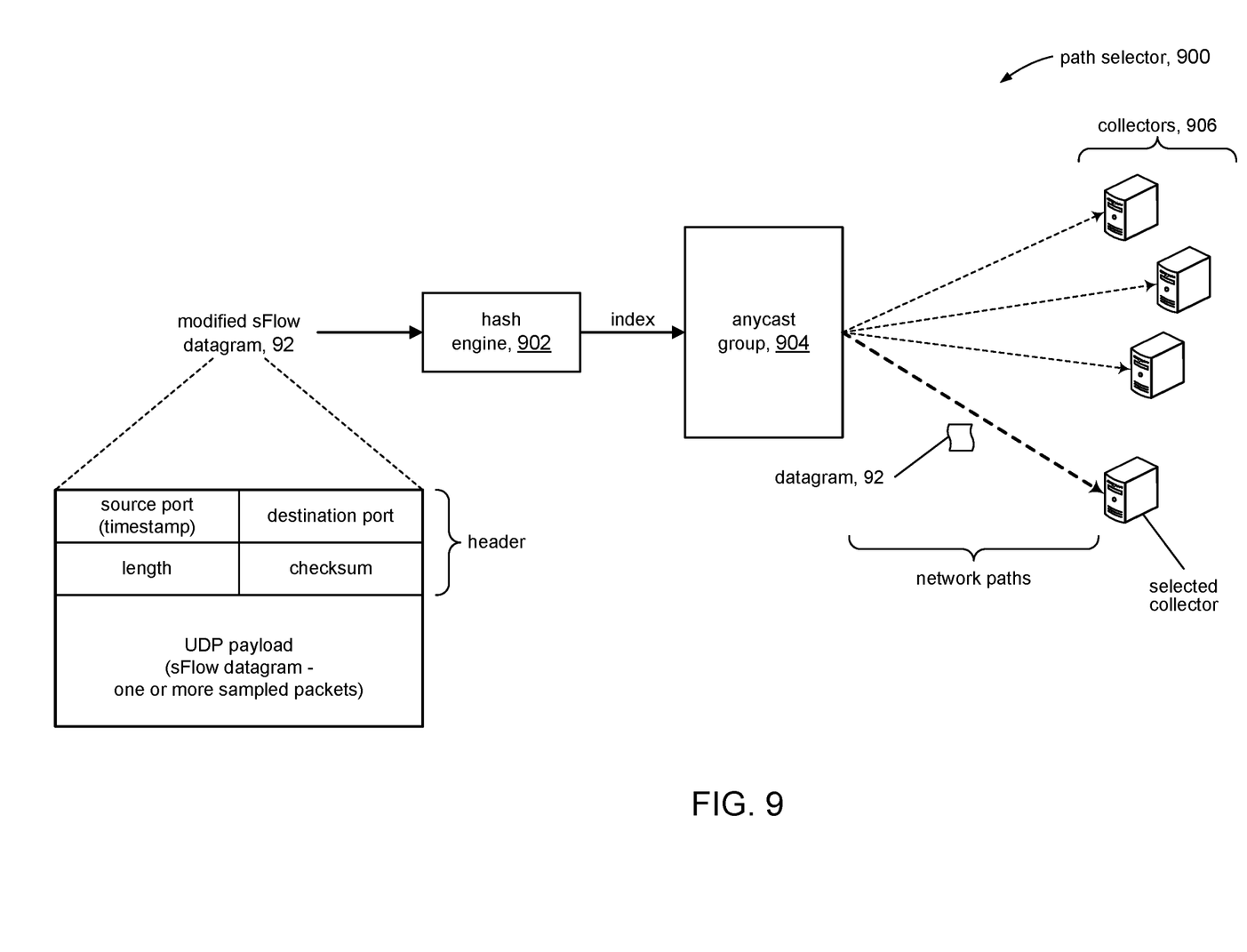
FIG. 9 shows a path selector in accordance with some embodiments.

FIG. 9 illustrates details for a path selector 900 in accordance with some embodiments of the present disclosure. In some embodiments, for example, the path selector 900 can use the known method of anycast IP addressing. In accordance with the present disclosure, the path selector 900 can include a hash engine 902 and an anycast group table 904.

The anycast group 904 can comprise a group of collectors 906 that share the same IP address. An sFlow datagram 92 is an input to the hash engine. The hash engine can compute a hash value modulo N using at least the header portion of the UDP packet, where N is the number of collectors in the anycast group 904. The output of hash engine 902 can serve as an index to identify one of the collectors 906 in the anycast group 904 to which the given sFlow datagram 92 is to be sent. The datagram can be encapsulated in an IP packet where the anycast IP address is stored in the destination IP address data field in the IP header.

In some embodiments, the collector 906 can be a monitoring tool such as a recorder, packet analyzer, or other such device. In other embodiments, the collector 906 can be an edge device on another network such as a monitoring fabric. As explained above, the UDP header (e.g., the s-port data field) contains entropy (e.g., timestamp, sequence number, etc.). The entropy will result in successive UDP packets selecting different collectors 906, thus spreading the sFlow datagrams across different data paths to the collectors.

FURTHER EXAMPLES

Features described above as well as those claimed below may be combined in various ways without departing from the scope hereof. The following examples illustrate some possible, non-limiting combinations:

(A1) A method in a network device for sampling data packets, the method comprising: receiving a plurality of data packets; sampling the received data packets; and transmitting the sampled data packets, including: generating a datagram comprising one or more of the sampled data packets; storing the datagram in a payload portion of a UDP (User Datagram Protocol) packet; storing, in a header portion of the UDP packet, dynamic information associated with a sampled data packet contained in the datagram, wherein the dynamic information varies between successive sampled data packets; selecting a path to the destination, from among a plurality of paths, using data in the header portion of the UDP packet; and transmitting the UDP packet to the destination on the selected path.

(A2) For the method denoted as (A1), data in the header portions of successive UDP packets differ from one UDP packet to the next, wherein successive UDP packets are transmitted to the destination on different paths.

(A3) For the method denoted as any of (A1) through (A2), the UDP packet is transmitted using ECMP (equal cost multipath), the method further comprising: generating a hash value using at least the header portion of the UDP packet: accessing an entry in an ECMP group comprising a plurality of port identifiers based on the hash value; transmitting the UDP packet on a port of the network device identified by the port identifier of the access entry.

(A4) For the method denoted as any of (A1) through (A3), the UDP packet is transmitted using an anycast IP (Internet protocol) address, the method further comprising: selecting a destination device from among a plurality of destination devices based on at least the header portion of the UDP packet, wherein each of the destination devices has the same anycast IP address; and transmitting the UDP packet to the destination device using the anycast IP address.

(A5) For the method denoted as any of (A1) through (A4), the dynamic information is a timestamp associated with the sampled data packet, and which varies from one sampled data packet to the next, or a sequence number associated with the datagram that varies from one datagram to the next, or a randomly generated number that is generated for each datagram.

(A6) For the method denoted as any of (A1) through (A5), the dynamic information is stored in a source port data field in the header of the UDP packet.

(B1) A network device comprising packet processing pipeline circuitry configured to: receive network traffic on an interface of the network device; sample the network traffic; and transmit datagrams that contain the sampled network traffic wherein, for each datagram: a data path to a collector is selected using dynamic information associated with said each datagram, wherein the dynamic information varies between successive datagrams; and said each datagram is transmitted on the selected data path, wherein successive datagrams are transmitted on different data paths to the collector.

(B2) For the network device denoted as (B1), the pipeline circuitry is further configured to: select the data path using the dynamic information associated with said each datagram; and transmit said each datagram on the selected data path.

(B3) For the network device denoted as any of (B1) through (B2), selection of the data path and transmission of said each datagram on the selected data path occurs in a downstream network device.

(B4) For the network device denoted as any of (B1) through (B3), the packet processing pipeline circuitry is further configured to: store said each datagram in a payload portion of a corresponding UDP packet; store the dynamic information in a header portion of the UDP packet, wherein the selected data path is selected based on the header portion of the UDP packet; and transmit the UDP packet on the selected data path.

(B5) For the network device denoted as any of (B1) through (B4), the dynamic information is stored in a source port data field in the header portion of the UDP packet.

(B6) For the network device denoted as any of (B1) through (B5), the packet processing pipeline circuitry is further configured to transmit said each datagram using ECMP, including: generating a hash value using the dynamic information associated with said each datagram; accessing an entry in an ECMP group comprising a plurality of port identifiers based on the hash value; transmitting said each datagram on a port of the network device identified by the port identifier of the access entry.

(B7) For the network device denoted as any of (B1) through (B6), the packet processing pipeline circuitry is further configured to transmit said each datagram using an anycast IP address, including: selecting a collector from among a plurality of collectors using the dynamic information associated with said each datagram, wherein each of the collectors has the same anycast IP address; and transmitting said each datagram to the collector using the anycast IP address.

(B8) For the network device denoted as any of (B1) through (B7), said each datagram comprises one or more data packets of the sampled network traffic, wherein the dynamic information is a timestamp value associated with one of the data packets in said each datagram.

(B9) For the network device denoted as any of (B1) through (B8), the dynamic information is a sequence number associated with said each datagram, wherein the sequence number is incremented with successive datagrams.

(B10) For the network device denoted as any of (B1) through (B9), the dynamic information is a randomly generated number that is generated for said each datagram.

(C1) A method in a network device for sampling data packets, the method comprising: receiving network traffic on an interface of the network device; sampling the network traffic; and transmitting datagrams that contain the sampled network traffic, wherein for each datagram: a data path to a collector is selected from among a plurality of data paths, using dynamic information associated with said each datagram, wherein the dynamic information varies between successive datagrams; and said each datagram is transmitted on the selected data path, wherein successive datagrams are transmitted on different data paths to the collector.

(C2) The method denoted as (C1), further comprising: storing said each datagram in a payload portion of a corresponding UDP packet; storing the dynamic information in a source port number data field in a header portion of the UDP packet, wherein the selected data path is selected based on the header portion of the UDP packet; and transmitting the UDP packet on the selected data path.

(C3) For the method denoted as any of (C1) through (C2), the plurality of data paths are data paths associated with ports in an ECMP group or associated with ports in a link aggregation group.

(C4) For the method denoted as any of (C1) through (C3), each data path in the plurality of data paths is associated with a corresponding collector, wherein selecting a data path to a collector includes selecting the collector from among a plurality of collectors.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for sampling data packets, the method comprising:
   receiving a plurality of data packets;
   sampling the received data packets; and
   transmitting the sampled data packets, including:
      generating a datagram comprising one or more of the sampled data packets;
      storing the datagram in a payload portion of a UDP (User Datagram Protocol) packet;
      storing, in a header portion of the UDP packet, a timestamp associated with a sampled data packet contained in the datagram, wherein the timestamp indicates a time at which the sampled data packet was received and varies between successive sampled data packets;
      selecting a path to the destination, from among a plurality of paths, using the timestamp in the header portion of the UDP packet; and
      transmitting the UDP packet to the destination on the selected path.

2. The method of claim 1, wherein timestamps in the header portions of successive UDP packets differ from one UDP packet to the next, and wherein successive UDP packets are transmitted to the destination on different paths.

3. The method of claim 1, wherein the UDP packet is transmitted using ECMP (equal cost multipath), the method further comprising:

generating a hash value using at least the timestamp in the header portion of the UDP packet:
accessing an entry in an ECMP group comprising a plurality of port identifiers based on the hash value;
transmitting the UDP packet on a port of the network device identified by the port identifier of the access entry.

4. The method of claim 1, wherein the UDP packet is transmitted using an anycast IP (Internet protocol) address, the method further comprising:
selecting a destination device from among a plurality of destination devices based on at least the timestamp in the header portion of the UDP packet, wherein each of the destination devices has the same anycast IP address; and
transmitting the UDP packet to the destination device using the anycast IP address.

5. The method of claim 1, wherein the timestamp is stored in a source port data field in the header of the UDP packet.

6. A network device comprising packet processing pipeline circuitry configured to:
receive network traffic on an interface of the network device;
sample the network traffic; and
transmit datagrams that contain the sampled network traffic wherein, for each datagram:
a data path to a collector is selected using a timestamp associated with a sampled data packet in said each datagram, wherein the timestamp indicates a time at which the sampled data packet was received and varies between successive datagrams comprising sampled network traffic; and
said each datagram is transmitted on the selected data path,
wherein successive datagrams are transmitted on different data paths to the collector.

7. The network device of claim 6, wherein the different data paths are associated with ports in an ECMP group or ports in a link aggregation group.

8. The network device of claim 6, wherein selection of the data path and transmission of said each datagram on the selected data path occurs in a downstream network device.

9. The network device of claim 6, wherein the packet processing pipeline circuitry is further configured to:
store said each datagram in a payload portion of a corresponding UDP packet;
store the timestamp in a header portion of the UDP packet, wherein the selected data path is selected based on the header portion of the UDP packet; and
transmit the UDP packet on the selected data path.

10. The network device of claim 9, wherein the timestamp is stored in a source port data field in the header portion of the UDP packet.

11. The network device of claim 6, wherein the packet processing pipeline circuitry is further configured to transmit said each datagram using ECMP, including:
generating a hash value using the timestamp associated with said each datagram;
accessing an entry in an ECMP group comprising a plurality of port identifiers based on the hash value;
transmitting said each datagram on a port of the network device identified by the port identifier of the access entry.

12. The network device of claim 6, wherein the packet processing pipeline circuitry is further configured to transmit said each datagram using an anycast IP address, including:
selecting a collector from among a plurality of collectors using the timestamp associated with said each datagram, wherein each of the collectors has the same anycast IP address; and
transmitting said each datagram to the collector using the anycast IP address.

13. A method in a network device for sampling data packets, the method comprising:
receiving network traffic on an interface of the network device;
sampling the network traffic; and
transmitting datagrams that contain the sampled network traffic,
wherein for each datagram:
a data path to a collector is selected from among a plurality of data paths, using a timestamp associated with a sampled data packet in said each datagram, wherein the timestamp indicates a time at which the sampled data packet was received and varies between successive datagrams comprising sampled network traffic; and
said each datagram is transmitted on the selected data path,
wherein successive datagrams are transmitted on different data paths to the collector.

14. The method of claim 13, further comprising:
storing said each datagram in a payload portion of a corresponding UDP packet;
storing the timestamp in a source port number data field in a header portion of the UDP packet, wherein the selected data path is selected based on the header portion of the UDP packet; and
transmitting the UDP packet on the selected data path.

15. The method of claim 13, wherein the plurality of data paths are data paths associated with ports in an ECMP group or associated with ports in a link aggregation group.

16. The method of claim 13, wherein each data path in the plurality of data paths is associated with a corresponding collector, wherein selecting a data path to a collector includes selecting the collector from among a plurality of collectors.

* * * * *